United States Patent [19]

DeRosa et al.

[11] Patent Number: 5,406,759
[45] Date of Patent: Apr. 18, 1995

[54] METHOD FOR PROTECTING SUBGRADE VERTICAL WALL FROM STONE IMPACTS IN BACKFILL OPERATION AND LAMINATE FOR ACCOMPLISHING THE SAME

[75] Inventors: Marc S. DeRosa, Taipei, Taiwan, Prov. of China; Robert F. Jenkins, Wakefield; Robert A. Wiercinski, Lincoln, both of Mass.; Stephen J. Agambar, Bucks, England

[73] Assignee: W. R. Grace & Co.-Conn., New York, N.Y.

[21] Appl. No.: 101,864
[22] Filed: Aug. 4, 1993
[51] Int. Cl.⁶ .............................................. E04B 1/92
[52] U.S. Cl. ............................ 52/169.14; 52/745.09; 428/351; 428/489
[58] Field of Search ........... 52/745.05, 745.09, 169.14, 52/169.5; 428/351, 489

[56] References Cited

U.S. PATENT DOCUMENTS

| | | | |
|---|---|---|---|
| 3,754,362 | 8/1993 | Dalmler | 52/169.14 X |
| 3,770,559 | 11/1973 | Jackson | 161/89 |
| 3,802,950 | 4/1974 | Stevens | 161/160 |
| 3,813,280 | 9/1971 | Olszyk et al. | 161/151 |
| 3,900,102 | 8/1975 | Hurst | 206/411 |
| 3,909,144 | 9/1975 | Garn et al. | 404/31 |
| 3,911,190 | 10/1975 | Meyers et al. | |
| 4,091,135 | 5/1978 | Tajima et al. | 428/40 |
| 4,172,830 | 10/1979 | Rosenberg et al. | 428/245 |
| 4,357,377 | 11/1982 | Yamamoto | 428/40 |
| 4,585,682 | 4/1986 | Colarusso et al. | 428/57 |
| 4,636,414 | 1/1987 | Tajima et al. | 428/40 |
| 4,651,494 | 3/1987 | Van Wagoner | 52/593 |
| 4,670,071 | 6/1987 | Cooper et al. | 156/71 |
| 4,719,723 | 1/1988 | Van Wagoner | 52/15 |
| 4,751,122 | 6/1988 | May | 428/41 |
| 4,755,409 | 7/1988 | Harkness | 428/489 X |
| 4,775,567 | 10/1988 | Harkness | 428/351 X |
| 4,789,578 | 12/1988 | Twyford et al. | 428/40 |
| 4,810,573 | 3/1989 | Harnett | 52/169.14 X |
| 4,871,605 | 10/1989 | Pagen | 428/489 X |
| 4,891,272 | 1/1990 | Ciaccia | 428/489 |
| 4,907,386 | 3/1990 | Ekroth | 52/169.14 |
| 4,911,975 | 3/1990 | Schult | 428/489 X |
| 4,992,334 | 2/1991 | Kindt | 428/489 |
| 5,000,999 | 3/1991 | Hollander | 428/489 X |
| 5,096,759 | 3/1992 | Simpson et al. | 428/40 |
| 5,143,766 | 9/1992 | Wenz | 428/489 X |
| 5,145,748 | 9/1992 | Gaidis | 428/489 |
| 5,180,255 | 1/1993 | Alexander | 52/169.19 X |

FOREIGN PATENT DOCUMENTS

| | | |
|---|---|---|
| 1230754 | 5/1971 | United Kingdom . |
| 1230755 | 5/1971 | United Kingdom . |
| 1230756 | 5/1971 | United Kingdom . |
| 1265952 | 3/1972 | United Kingdom . |
| 1265953 | 3/1972 | United Kingdom . |
| 1341413 | 12/1973 | United Kingdom . |
| 1473316 | 5/1977 | United Kingdom . |
| 1548394 | 7/1979 | United Kingdom . |
| 2040797 | 10/1982 | United Kingdom . |
| 2152546 | 7/1985 | United Kingdom . |

OTHER PUBLICATIONS

J. H. Briston, Dr. L. L. Katan; "Mechanical Properties"; Plastics Films 3rd Ed.; (Longman Scientific & Technical–1988); pp. 100–103.

Primary Examiner—Carl D. Friedman
Assistant Examiner—Beth A. Aubrey
Attorney, Agent, or Firm—Craig K. Leon; William L. Baker

[57] ABSTRACT

An exemplary method for measuring the impact resistance of polymeric film-based laminates involves a falling dart test using laminates that are essentially fully adhered to an inclined mortar block in emulation of stone impacts in backfill situations. Methods for protecting subgrade vertical walls from stone impacts in backfill operations involve the use of a four-layer laminate having an impact energy of at least 50 lb-ft²/sec² in accordance with a falling dart test using a mortar block inclined at an angle of 60° from vertical. The film-based laminate, comprising a center film having a Young's modulus of at least 200,000 psi (ASTM D 882), is surprisingly discovered to have synergistic properties to provide an average impact energy, as determined in accordance with the 60° impact test, which far exceeds the additive impact energy of the components and which reflects more accurately the performance of the laminate in the actual backfill situation.

16 Claims, 2 Drawing Sheets

METHOD FOR PROTECTING SUBGRADE VERTICAL WALL FROM STONE IMPACTS IN BACKFILL OPERATION AND LAMINATE FOR ACCOMPLISHING THE SAME

BACKGROUND OF THE INVENTION

A. Field of the Invention

The present invention relates to a method for measuring the impact resistance of a polymeric film-based laminate, and more particularly to a method using a polymeric film-based laminate installed upon a subgrade substrate for resisting the rupturing impact of stones backfilled against the laminate.

B. Related Art

The impact strength of a film is a measure of its resistance to shock loading. One common method for measuring the impact strength of film is known as the falling dart method. This method employs a dart having a hemispherical head attached to a weighted body held by an electromagnet above the film sample. See e.g., Bresson, *Plastic Films*, 3d. Ed. (Longman Scientific & Technical, New York 1988) pp. 100–103. When released, the dart drops onto the film sample which is horizontally mounted across a hole in a table. The impact strength of the film may be calculated, for example, by dropping the dart from various heights beginning from a height which does not rupture the sample, to a height at which 50% of these samples rupture. The impact energy of the film (i.e. the resistance of the film to impacts having such energy) is calculated from the equation $E = mgh$ wherein m is the mass of the dart (lbs), g is the acceleration due to gravity (32 ft/sec$^2$), and h is the height (ft) at which 50% of the samples rupture such that E is expressed in terms of lbs-ft/sec$^2$.

The present inventors have surprisingly discovered that the standard falling dart test, even when samples are mounted upon a concrete block, gives results that do not necessarily correlate with performance in the field. One particular instance in which this failure of correlation occurs is in backfill construction operations, wherein a mixture of stones (i.e., rocks, pebbles) is poured ("backfilled") against a subgrade building foundation upon which a waterproofing laminate, comprising a carrier film and waterproofing sealant layer, has been installed. It is not uncommon for backfill to contain stones large enough to rupture or puncture the laminate on impact and defeat its waterproofing purpose.

SUMMARY OF THE INVENTION

The present invention provides a method for measuring the impact resistance of film-based waterproofing laminates. An exemplary method involves providing an inclined mortar block impact surface, adhering to this surface a film-based waterproofing laminate, and dropping a dart upon the laminate. Other exemplary methods of the invention involve various dropping distances or dart shapes.

This method of using an inclined impact surface having the adhered laminate, rather than a horizontal surface, more closely emulates actual backfill situations in which stones are backfilled downwards against a subgrade vertical foundation wall or floor upon which a waterproofing laminate is adhered. In the actual backfilling situation, stones exert angled impact forces having horizontal and vertical vector components with respect to the plane of the laminate.

The present invention concommitantly provides a method for protecting a waterproofed subgrade substrate, such as a horizontal or vertical surface, from stone impacts in backfill operations using an impact resistant polymeric film-based multi-layered laminate. An exemplary method comprises the steps of forming an essentially fully-adhered bond between a subgrade substrate, such as a vertical wall, and a rollable sheet-like waterproofing laminate comprising first and second rubber bitumen composition layers each having first and second generally parallel edges, each having a thickness between 10–50 mils, and each extending continuously between the edges, the first rubber bitumen layer being essentially fully-adhered to the subgrade substrate and located innermost of the bitumen layers, a center film sandwiched continuously to and between said bitumen layers and having a Young's tensile modulus of at least 200,000 psi (as determined in accordance with ASTM D 882) and a thickness of 2–15 mils, the center film preferably comprising poly(ethylene terephthalate), the second bitumen layer being superimposed outermost of the center film, and a continuous outer polymeric layer having a thickness of at least 0.25 mils is continuously bonded to and superimposed upon the second bitumen layer; and backfilling stones or stone-containing soil downward at an angle against the laminate, the laminate having an average impact energy in a dropped dart impact test (at 70° F.) of at least 50 lb-ft$^2$/sec$^2$ when adhered to a mortar block inclined at 60° from the vertical direction of dart impact. The present invention also provides an exemplary laminate as described above and further herein.

DETAILED DESCRIPTION OF PREFERRED EMBODIMENTS

The impact test of the present invention is designed to approximate the impact resistance of a polymeric film-based waterproofing laminate that is fully adhered upon a subgrade vertical wall to the impact from stones or stone-containing soil that is backfilled against the laminate. It is believed by the present inventors that a modification of the falling dart test to provide for an impact between the falling dart and a waterproofing laminate attached to an inclined surface more accurately approximates the behavior of stones which impact against the laminate in a backfilling situation. A further exemplary step in the method involves using dart heads with varying radii of curvature to mimic the variously sized and shaped stones that occur in the actual backfilling process. Four darts having radii of curvature of 1/16", ⅛", ¼", and ½" were employed.

Figure 1:
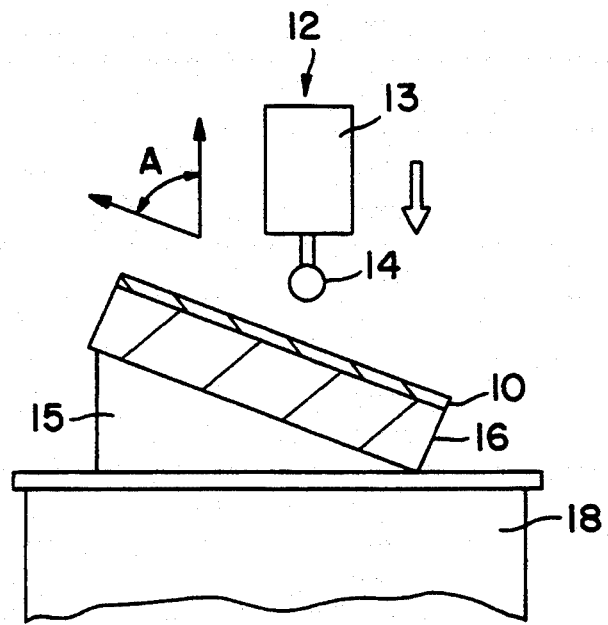
FIG. 1 is a diagram of an exemplary test apparatus for measuring the impact strength of an adhered polymeric-film based waterproofing laminate in accordance with the present invention.

FIG. 1 shows an exemplary test method for measuring the impact resistance or "energy" of a polymeric film-based waterproofing laminate 10 that comprises a polymeric film layer superimposed upon a preformed layer of waterproofing sealant material, such as rubber-containing bitumen. A weighted dart 12 having a cone shaped or spherically shaped head 14 is dropped onto the waterproofing laminate 10, which is fully adhered to an inclined surface 16. Cone shaped darts should have 90° cones (See FIG. 2, 14A). The inclined surface used in the present invention is a mortar block (3"×4"×16") having a compressive strength of 4,000–5,000 psi.

The term "essentially fully adhered," as used herein, means and refers to the condition in which a laminate 10 comprising at least one film carrier layer and a waterproofing sealant material layer 30 is continuously attached at substantially all points of contact with a substrate surface 20, such as the concrete foundation wall 20 of the backfilling situation or the mortar block 16 of the impact test being described herein. The ability of a film-based waterproofing laminate to remain essentially fully adhered, so as to prevent penetration and lateral seepage or migration of water (such as through a puncture or under an edge of the laminate and then transversely along the plane of the laminate to a crack or opening in the concrete wall) is one of the purposes sought to be achieved by the present invention.

The term "performed" as used herein refers to a waterproofing sealant material that has been layered, before installation of the laminate, onto a carrier film such that it has a substantially uniform thickness. The layering of the sealant onto the carrier can be done by any means. Preferably, it is accomplished by coating the first rubber bitumen layer 30 in a uniform thickness upon a release paper (which is removed at the installation site), applying the center film layer 31 onto the first rubber bitumen layer 30, applying the second rubber bitumen layer 32 onto the center film 31, and applying the outer film layer 33 onto the second rubber bitumen layer 32.

The impact test surface 16 is preferably mounted at an angle A, between 10°–80°, and more preferably 60°, relative to the vertical direction of the falling dart upon a concrete table having a 1 inch thick steel top and solid concrete base to ensure that the impact of the falling dart 12 is not absorbed or dissipated by the table 18. A triangular steel or concrete brace or wedge 15 can be used to mount the surface 16 at angle A upon the table 18.

Dart heads 14 are preferably made of hardened steel and fitted into an aluminum housing 13. The dart head and aluminum housing preferably have a combined weight of 3.5–4.0 kg.

Figure 2:
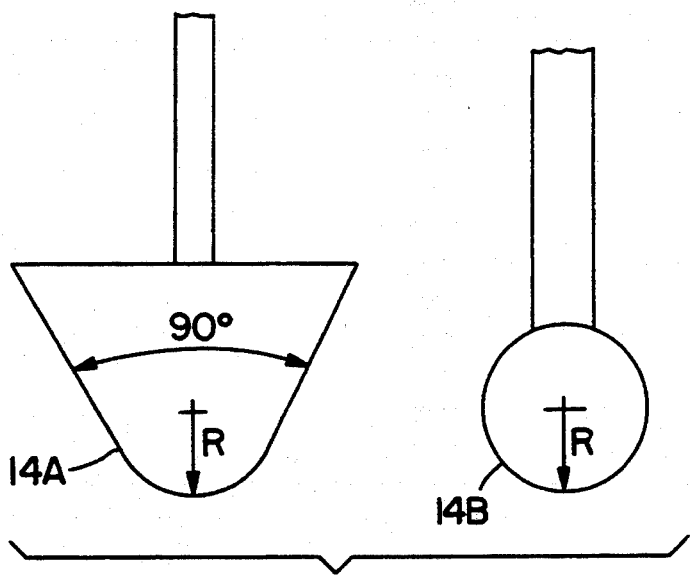
FIG. 2 is a side view of exemplary dart heads used in the method illustrated in FIG. 1.

As shown in FIG. 2, the dart heads are cone-shaped (90°) 14A or spherically-shaped 14B. Both are illustrated with radius of curvature R.

Cone-shaped darts are preferred for testing laminate systems having substantial thicknesses, such as a system comprising a waterproofing membrane and a polystyrene board. Spherically-shaped dart heads 14B are preferred for use on laminate systems having a total thickness less than the diameter of the dart head. Darts are dropped unrestrained (i.e., not within a guide tube) from predetermined heights upon the adhered inclined laminate sample, preferably by deactivating an electromagnet which holds the darts.

An exemplary test for determining impact resistance in accordance with the present invention involves dropping a dart 12 from varying heights onto sample laminates 10 that are essentially fully adhered to an inclined mortar block 16. The dart is first dropped from a height which does not cause a rupture or penetration through the laminate 10. Successive tests are run at increased heights from which the dart is dropped five or more times until the center film 31 of the laminate sample ruptures half (50%) of the time. At that height, the energy which corresponds to the impact being resisted is calculated by using the formula $$E = mgh$$

wherein "m" is the combined mass of the dart head and housing (lbs), "g" is the acceleration due to gravity (32 ft/sec$^2$), and "h" is the distance from the dart tip to the mortar block impact point (ft). Thus, units for E are lb-ft$^2$/sec$^2$.

An average impact energy is evaluated which reflects the actual backfilling situation. The average energy $E_a$ has the form $$E_a = \Sigma n_i E_i$$

where $E_i$ is the impact energy measured for a given radius of dart curvature, $n_i$ is a number fraction, and $\Sigma n_i$ is 1. Values for $n_i$ are chosen to reflect a radius of curvature distribution for stone edges most likely to occur in soil. For the present analysis, a worst case situation was chosen. Crushed granite, commonly known as "rip rap," was used; and, thus, a curvature distribution for the stone edges of this crushed granite was determined.

Measurement were performed by making impressions of hundreds of stone edges in a 50 mil layer of molding clay rolled onto a steel plate. The stone edge radius ($R_S$) was calculated for all of the stone edges using the formula $$R_S = s^2/8d + \tfrac{1}{2}d$$

where "s" is the smallest width of the impression and "d" is the depth of the impression. Several hundred measurements were made in order to calculate a radius of curvature distribution for the stone edges.

The radius of curvature distribution is divided into four (4) fractions: $n_{1/16}$, $n_{\frac{1}{8}}$, $n_{1/4}$, and $n_{\frac{1}{2}}$. $N_{1/16}$ is the fraction of stone edges with radii of curvature less than 3/32"; $n_{\frac{1}{8}}$ is the fraction of stone edges with radii of curvature from 3/32" to less than 3/16"; $n_{\frac{1}{4}}$ is the fraction of stone edges with radii of curvature from 3/16" to less than ⅜"; and $n_{\frac{1}{2}}$ is the fraction of stone edges greater than or equal to ⅜". The number fraction at each radius is shown below:

$$n_{1/16} = 0.26$$

$$n_{\frac{1}{8}} = 0.485$$

$$n_{\frac{1}{4}} = 0.225$$

$$n_{\frac{1}{2}} = 0.03$$

Thus, 26% of the stones were determined to have radii of curvature less than 3/32". The average energy $E_a$ for this particular radius distribution is determined by the formula: $E_a = \Sigma n_{1/16} E_{1/16} + n_{\frac{1}{8}} E_{\frac{1}{8}} + n_{\frac{1}{4}} E_{\frac{1}{4}} + n_{\frac{1}{2}} E_{\frac{1}{2}}$.

Figure 3:
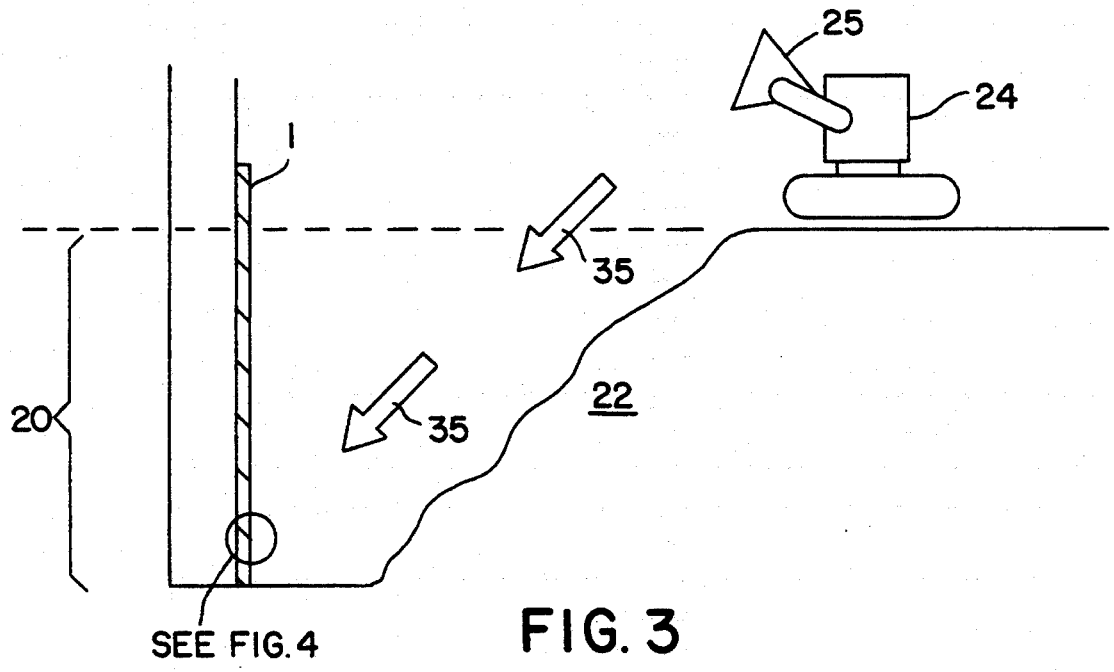
FIG. 3 is side plan view of an exemplary method of the present invention for protecting a subgrade construction surface from stone impacts in a backfill operation using an exemplary waterproofing laminate of the present invention.

The above-described laboratory method correlates well with results obtained in actual backfilling situations. An exemplary backfilling operation of the present invention, using a novel exemplary laminate that is rollable, flexible, and yet provides great impact resistance to backfilled stones and stone-containing soil is illustrated in FIG. 3. A laminate 10 comprising at least one polymeric film superimposed upon a waterproofing adhesive layer is essentially fully adhered to a subgrade (eg. below ground) vertical wall 20 against which stones 35 (represented by arrows) are backfilled downward at an angle against the adhered laminate 10.

The subgrade substrate 20 may be part of a concrete foundation or other below grade installation, such as a vertical wall, horizontal decking, tunnel, bridge foundation, or other civil engineering structure. The subgrade substrate is below ground level, for example such as in an excavated hole situated six feet or more below ground level, and is exposed to stones or stone-containing soil backfilled downwards along a sloped declivity 22 from a front end loader 24 or other excavation equipment.

For the purposes of the field trials, the bucket was raised, although this would not be done in actual practice. Many front end loaders 24 have buckets 25 that may be raised 8 feet or more above ground level, such that backfilled stones or stone-containing soil travel a greater distance to the installed laminate 10, with presumably an increased impact effect.

An exemplary method for protecting a subgrade substrate 20, such as a vertical wall, from stone impacts in a backfill operation is shown in FIG. 3. The method comprises the steps of forming an essentially fully-adhered bond between the substrate 20 and a rollable sheet-like waterproofing laminate 10 (such as the one shown in the enlarged view of FIG. 4). The laminate 10 comprises first 30 and second 32 rubber bitumen composition layers each having, and extending continuously between, first and second generally parallel edges, each layer 30 and 32 having a thickness between 10–50 mils, the first layer 30 being essentially fully-adhered to the subgrade substrate 20 and located innermost of the bitumen layers 30 and 32, a center film 31 having a thickness of 2–15 mils and a Young's tensile modulus of at least 200,000 psi, the film layer being sandwiched continuously to and between said bitumen layers 30 and 32, the second bitumen layer 32 being superimposed outermost upon the center film 31, and a continuous outer polymeric layer 33 having a minimum thickness of at least 0.5 mils and being continuously bonded to and superimposed upon the second bitumen layer 32; and backfilling stones or stone-containing soil 35 downward at an angle against the essentially fully-adhered laminate 10, the laminate having an average impact energy of at least 50 lb-ft$^2$/sec$^2$ as determined by the falling dart impact test method employing the test sample fully adhered to a 4,000–5,000 psi (compressive strength) mortar block inclined 60° from the vertical direction of the falling dart.

The center film 31 may comprise polypropylene, although rigid poly(vinyl chloride) (e.g., substantially unplasticized), polycarbonate, polymethyl methacrylate, and polystyrene are more preferred, and poly(ethylene terephthalate) is most preferred. As mentioned above, the center film should have a Young's tensile modulus of at least 200,000 psi as determined in accordance with ASTM D-882, although a tensile modulus of at least 300,000 psi is more preferred, and a tensile modulus of at least 400,000 psi is most preferred. Backfilled stones 34 are caused to impact against the laminate 10, which resists puncture and rupture, such that the subgrade substrate 20 remains protected from water and moisture after the backfilling is completed.

In the method for protecting a subgrade substrate 20 such as a vertical wall, and in exemplary waterproofing laminates of the invention, it is desired both to have a flexible laminate that permits easy rolling and unrolling, so as to facilitate transportation of the laminate into, and easy application within an excavated installation site, as well as to provide a laminate that is sufficiently tough to resist the impact of backfilled stones. The attainment of a flexible and rollable waterproofing laminate and the attainment of impact resistance are paradoxical goals, because the use of rigid materials, added layers, or increased layer thicknesses, to increase rupture and puncture resistance, has usually meant a loss of flexibility and hence rollability. In the past, rigid boards comprising expanded polystyrene and the like have been separately applied to site-applied waterproofing agents or preformed waterproofing laminates to achieve impact resistance. However, the present inventors have achieved the ability to protect subgrade substrates from backfilled stone impacts using a self-protected waterproofing laminate, one that does not require a rigid protective board or cladding material.

The inventors have also surprisingly discovered, through implimentation of the method for measuring impact energy as described above, that the impact resistance of a polymeric film-based laminate, wherein a central film is located between two adhesive material layers, is dependent upon the modulus (i.e., Young's modulus of elasticity) of the central film rather than any outermost layers and upon having a particular combination of materials, a particular material layer arrangement, and particular layer thickness ranges which are believed to provide a synergistic combination.

Figure 4:
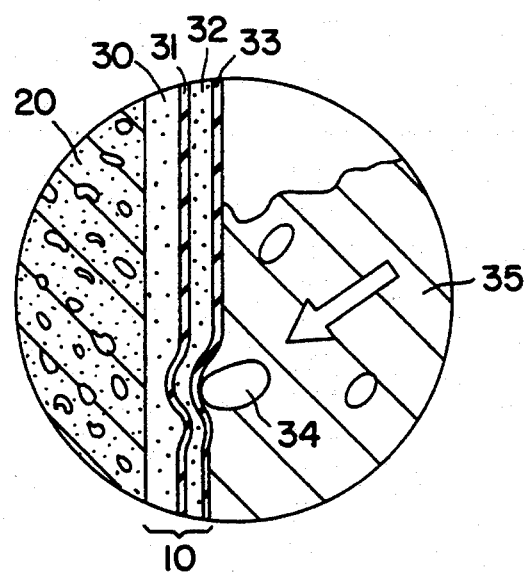
FIG. 4 is an enlarged illustration of the exemplary laminate shown in FIG. 3.

As shown in FIG. 4, a most preferred impact resistant laminate 10 of the invention comprises inner 30 and outer 32 waterproofing sealant layers, each comprising a mixture of rubber and bitumen and having 25 mils thickness. The 25 mil rubber bitumen layers 30 and 32 are hot melt applied to either side of, and therefore sandwich, a 7 mil poly(ethylene terephthalate) center film 31. It is specifically intended that the center film 31 is a film rather than a mesh, web, fabric, or felt layer since such non-film layer materials do not provide sufficient resistance to subterranean hydrostatic pressure.

The outer polymeric layer 33 is preferably at least 0.25 mils thickness or more. More preferably, the outer film 33 comprises a PVC film or polyethylene film (e.g., Valeron ® sold by Van Leer Plastics) having 4 mils thickness, or a closed-cell polyethylene foam layer having preferably at least 40 mils thickness and more preferably at least 80 mils thickness and a density of 50 kgs./m$^3$. The sealant material (as used in layers 30 and 32) preferably comprises natural or synthetic rubber, virgin or reclaimed, blended into bitumen to provide a smooth mix. The sealant material may also comprise a butyl-based adhesive or any other type of non-bituminous, rubber-based pressure sensitive adhesive.

Preferably, the bituminous adhesive comprises a processing oil, such as an aromatic oil, and the ratio by weight of bitumen/oil to rubber should preferably be in the range of 70:30 to 95:5 and more preferably 75:25 to 93:7. The rubber bitumen comprising the first inner layer 30 should be such that it self-adheres to the concrete wall 20 without the use of heat or bonding agents. The efficacy of the exemplary laminate is demonstrated in the examples below.

The first rubber bitumen layer 30 can be adhered to a release sheet, such as known in the waterproofing art, to permit the laminate 10 to be rolled up for transportation to the work site. The release sheet is then discarded after the laminate 10 is installed upon the subgrade wall 20.

EXAMPLE I

Lab tests and backfilling trials were run on self-protected waterproofing laminates. The various waterproofing laminate samples contained the following materials and layered arrangements and layer thicknesses:

| Sample | Layer Thickness/Arrangement |
| --- | --- |
| No. 1 | 4 mils outer polyethylene film |
| | 25 mils rubber and bitumen layer |
| | 7 mils poly(ethylene terephthalate) film |
| | 25 mils and bitumen layer |
| No. 2 | 7 mils outer poly(ethylene terephthalate) film |
| | 1–2 mils hat melt pressure sensitive adhesive |
| | 4 mils polyethylene film |
| | 50 mils rubber/bitumen layer |
| No. 3 | 4 mils outer aluminum foil film |
| | 1–2 mils hat melt pressure sensitive adhesive |
| | 2 mils poly(ethylene terephthalate) film |
| | 50 mils rubber and bitumen layer |

Tests were run on all of the samples using: (1) the 60° lab impact test described above (using all four darts and a sample inclined 60° from the vertical direction of dart impact); (2) a 90° test similar to the 60° test (except that the sample was perpendicular to the angle of dart impact), and (3) actual backfill trial runs. The mortar block had dimensions of 3"×4"×16" and a compressive strength of 4,000–5,000 psi. The sample was adhered onto the 3"×16" face of the block. The spherically shaped darts were used on the three samples.

The backfill trial runs were conducted using a vertical cast concrete wall that was set ten feet below grade (ground level). Wide (3 ft.) sheets of the self-protected laminates (Samples Nos. 1–3) were each adhered to the wall, and several sheets of each sample were tested. The stone-containing backfill comprised ⅔ (by volume) clay soil and ⅓ crushed granite. This backfill is considered severe by normal standards, and is designed to create punctures in the membrane thereby allowing differentiation between impact resistance of the composites. The data obtained was used to calculate puncture rate for each of the samples above. Backfill was dumped into the edge of the excavation with a front end loader. The bucket of the loader was raised to a maximum height of 10 feet above grade prior to dumping to maximize the impact energy of the stones. The backfill was thereafter removed carefully so as not to independently cause puncturing or rupturing of the laminate.

The puncture rate of field tested laminates was computed as follows:

Puncture Rate = P/S × 100 wherein P is the number of punctures in the laminate (ie. through all of the films) and S is the number of stones that come into contact with the laminate. The results are tabulated below (with relative rankings noted in parenthesis). The average impact energy is inversely proportional to puncture rate.

TABLE

| Sample No. | 60° Lab Test $E_a$ lb-ft²/sec² | 90° Lab Test $E_a$ lb-ft²/sec² | Puncture Rate |
| --- | --- | --- | --- |
| 1 | 83 (1) | 23 (3) | 5.6 (1) |
| 2 | 23 (2) | 27 (2) | 6.3 (2) |
| 3 | 10 (3) | 158 (1) | 19.6 (3) |

The correlation between the 60° lab test and field test is much better than the correlation between the 90° lab test and field puncture rate. The average impact energy as determined by the 60° impact test more accurately reflected the performance of the adhered laminate in actual field applications than did the 90° impact test. The results of the 90° impact test, which indicated that the average impact energy $E_a$ of 158 lb-ft²/sec² for Sample No. 3, proved deceptive because Sample No. 3 had a high failure rate (19.6 percent) in spite of the relatively high $E_a$ figure.

One of the factors contributing to good correlation between the 60° test results and field test puncture rate is the test angle. In the 60° impact test, the dart is free to slide across the surface of the membrane to a certain extent as the laminate is impacted. This situation is analogous to what occurs as a stone impacts a laminate that is fully adhered to a subgrade vertical wall in an actual backfilling situation. For the 90° impact test there is no such sliding motion.

The use of the novel impact energy measurement tests described herein have led comcommitently to the discovery of the novel method for protecting a subgrade vertical waterproofed wall from the impact of stones in the backfill operation, as well as to the discovery of novel impact resistant laminate structures, as described above.

The preferred laminate of the invention, comprising the 25 mil first and second rubber bitumen layers 30 and 32 sandwiching the 7 mil continuous poly(ethylene terephthalate) center film 31, covered by an outer polymeric layer 33 (e.g., 4 mils cross-laminated polyethylene film such as Valeron ®), are well suited as a combination to withstand the impact of impacts having angled components (ie. a force component vector that is not merely perpendicular to the plane of the laminate). Poly(ethylene terephthalate) film is available from a number of manufacturers.

EXAMPLE II

A two-layer laminate comprising 4 mils of polyethylene and 25 mils of rubber bitumen were adhered to the inclined mortar block and tested using the 60° impact test as described above. The average impact energy $E_a$ was determined to be 6 lb-ft²/sec². The same was done with a two-layer laminate comprising 7 mils of poly(ethylene terephthalate) film and 25 mils of rubber bitumen; and the average impact energy $E_a$ was determined to be 17 lb-ft²/sec². When added together, the sum of the individual impact energies equal 23 lb-ft²/sec².

However, when the two-layer laminate comprising polyethylene/rubber bitumen is adhered onto the two-layer laminate comprising the poly(ethylene terephthalate)/rubber bitumen layers to form a four-layer laminate (with the poly(ethylene terephthalate) as a center film sandwiched between the rubber bitumen layers), the impact energy is determined to be 83 lb-ft²/sec² according to the 60° impact test (at 70° F.).

Therefore, the inventors surprisingly have discovered that the components of the above-described four layer combination interact synergistically to provide an impact energy that far exceeds the additive impact energy of the components.

EXAMPLE III

A two-layer laminate comprising a layer of 80 mils polyethylene closed-cell foam and a layer of 25 mils rubber bitumen was adhered to the inclined mortar block and subjected to the 60° impact test above described (with the exception that a 2 kg. dart instead of a 4 kg. dart was used).

The average impact energy $E_a$ of this sample was 29 lb-ft$^2$/sec$^2$. The same was done with a two-layer laminate comprising 7 mils of poly(ethylene terephthalate) film and 25 mils of rubber bitumen; the average impact energy $E_a$ was 17 lb-ft$^2$/sec$^2$. When added together, the additive value is 46 lb-ft$^2$/sec$^2$.

However, when the foam sample is adhered onto the poly(ethylene terephthalate) film sample to form a four-layer laminate, with a poly(ethylene terephthalate) center film sandwiched between the bitumen layers, the impact energy is determined to be 85 lb-ft$^2$/sec$^2$ according to the 60° impact test (at 70° F.). Again, a synergistic interaction is seen involving the rubber bitumen/PET/rubber bitumen sandwich covered by a polymeric outer sheet layer.

EXAMPLE IV

Various four-layer laminate samples were constructed using an outer film layer comprising 4 mils of polyethylene and the following materials as the center film sandwiched by inner and outer rubber bitumen ("RB") layers: polyethylene ("PE"), poly(ethylene terephthalate) ("PET"), poly(vinyl chloride) ("PVC"), polycarbonate ("PC"), and low density polyethylene ("LPDE").

| Sample Laminate | $E_a$ (lb-ft$^2$/sec$^2$) |
| --- | --- |
| 4 PE/25 RB/7 PET/25 RB | 83 |
| 4 PE/25 RB/10 PVC/25 RB | 39 |
| 4 PE/25 RB/7 PC/25 RB | 35 |
| 4 PE/25 RB/8 PP/25 RB | 24 |
| 4 PE/25 RB/10 LDPE/25 RB | 21 |

The average impact energy for each laminate combination was determined in accordance with the 60° impact test (at 70° F.) using the 4 kg. dart as in Examples I and II above. The laminates were assessed in terms of impact energy (and are identified according to the nature of the center film) as follows:

| | |
| --- | --- |
| PET | 500,000 psi |
| PVC | 400,000 psi |
| PC | 350,000 psi |
| PP | 225,000 psi |
| LDPE | 50,000 psi |

Thus, the inventors surprisingly discovered that the laminate impact strength was proportional to the modulus of the center film.

Incidentally, it is noted that in the 60° impact test, the machine direction of films should be aligned downward along the sloped mortar block. Surprisingly, the inventors have discovered that the top layer 33 is usually penetrated and sacrificed during the impact, perhaps because the second rubber bitumen layer 32 located between the films 31 and 33 functions as a slip plane. The selection of the top layer and thickness is therefore not highly critical.

EXAMPLE V

The 60° impact test was performed on two further laminate samples. Each laminate comprised a 4 mil outer polyethylene layer (PE) and a 7 mil poly(ethylene terephthalate) center film (PET), with different thicknesses (expressed in mils) located on either side of the PET layer, as follows:

| Sample Laminate | $E_a$ (lb-ft$^2$/sec$^2$) |
| --- | --- |
| 4 PE/45 RB/7 PET/5 RB | 76 |
| 4 PE/5 RB/7 PET/45 RB | 39 |

When these results are compared with the performance of the preferred laminate (See Sample No. 1: 4 PE/25 RB/7 PET/25 RB), which provided an average impact energy of 83 lb-ft$^2$/sec$^2$, it is surprisingly discovered that the high modulus center film 31 must not be located too close to the top of the laminate. Preferably, the film 31 is located between two bitumen layers 30 and 32 having equal thicknesses.

EXAMPLE VI

A sample laminate having a 7 mil outer poly(ethylene terephthalate) (PET) film and a 4 mil polyethylene center film (PE) was tested using the 60° impact test, and compared to the preferred laminate (4 PE/25 RB/7 PET/25 RB) described above.

| Sample Laminate | $E_a$ (lb-ft$^2$/sec$^2$) |
| --- | --- |
| 4 PE/25 RB/7 PET/25 RB | 83 |
| 7 PET/25 RB/4 PE/25 RB | 37 |

It is therefore concluded that the arrangement of the component film layers of the above described preferred laminate are critical to ensuring sufficient impact resistance in the backfill operation.

In viewing the foregoing 60° impact test results, the inventors surprisingly discovered that the nature of the center film, the respective thicknesses of the rubber bitumen layers, the particular combination of layer materials, and the particular material layer arrangement provide a synergistic combination.

As modifications of the foregoing examples and illustrations may be evident to those skilled in the art in view of the disclosures herein, the scope of the present invention is intended to be limited only by the appended claims.

We claim:

1. A method for protecting a subgrade construction surface having a waterproofing laminate adhered thereupon from the rupturing impact of stones in a backfill operation, comprising the steps of:

forming an essentially fully-adhered bond between a subgrade substrate and a rollable sheet-like waterproofing laminate comprising first and second rubber bitumen composition layers each having first and second generally parallel edges, each having a thickness between 10–15 mils, and each extending continuously between the edges, the first rubber bitumen layer being essentially fully-adhered to the subgrade substrate and located innermost of the bitumen layers, a center polymeric film having a Young's tensile modulus of at least 200,000 psi (as determined in accordance with ASTM D 882), said center film having a thickness between 2-15 mils and being sandwiched continuously to and between said bitumen layers, the second bitumen layer being superimposed outermost of the film, and a continuous polymeric layer having a minimum thickness of at least 0.25 mils continuously bonded to and superimposed upon the second bitumen layer, said laminate having an average impact energy of at least 50 lb-ft$^2$/sec$^2$ as determined in accordance with a falling dart test in which the laminate is fully adhered upon a 4,000-5,000 psi mortar block inclined 60° from vertical (at 70° F.); and backfilling stones downward at an angle against the fully-adhered laminate.

2. The method of claim 1 wherein said subgrade substrate comprises a vertical wall.

3. The method of claim 2 wherein darts having radii of curvature of 1/16", ⅛", ¼", and ½" are employed in the determination of average impact energy.

4. The method of claim 2 wherein said subgrade vertical wall comprises concrete and extends at least six feet below grade.

5. The method of claim 4 wherein said center film has a Young's modulus of at least 300,000 psi.

6. The method of claim 5 wherein said center film has a Young's modulus of at least 400,000 psi.

7. The method of claim 2 wherein said center film comprises a material selected from the group consisting of poly(ethylene terephthalate), poly(vinyl chloride), polycarbonate, polymethyl methacrylate, polystyrene, and polypropylene.

8. The method of claim 7 wherein said center film comprises poly(ethylene terephthalate) having a thickness of 7 mils, said bitumen layers are 25 mils thick, and said outer polymeric layer comprises a cross-laminated polyethylene film.

9. The method of claim 8 wherein said center film comprises poly(ethylene terephthalate) having a thickness of 7 mils, said bitumen layers are 25 mils thick, and said outer polymeric layer comprises a closed-cell polyethylene foam.

10. The method of claim 9 wherein said closed-cell polyethylene foam layer has a thickness of at least 40 mils.

11. A laminate comprising first and second rubber bitumen layers having a thickness of 10-50 mils, said first bitumen layer operative to form an essentially fully adhered bond with a subgrade substrate; a center film sandwiched between said bitumen layers and comprising a material selected from the group consisting of poly(ethylene terephthalate), rigid poly(vinyl chloride), polycarbonate, polymethyl methacrylate, polystyrene, and polypropylene, said film having a Young's modulus of at least 200,000 psi (ASTM D 882) and a thickness of 2-15 mils; and an outer polymeric layer continuously adhered to said second bitumen layer, said laminate having an average impact energy of at least 50 lb-ft$^2$/sec$^2$ as determined in accordance with a falling dart test in which the laminate is fully adhered upon a 4,000-5,000 psi mortar block inclined 60° from vertical (at 70° F.).

12. The laminate of claim 11 wherein said laminate is essentially fully adhered to a vertical subgrade wall, and backfilled stones are in contact with said outer polymeric layer of said laminate.

13. The laminate of claim 11 wherein the average impact energy is determined using darts having radii of curvature of 1/16", ⅛", ¼", and ½".

14. The laminate of claim 11 wherein said laminate comprises two rubber bitumen layers each at least 25 mils thick, and said center film comprises 7 mils poly(ethylene terephthalate).

15. The laminate of claim 11 wherein said outer polymeric layer comprises a cross-laminated polyethylene film.

16. The laminate of claim 11 wherein said outer polymeric layer comprises a closed-cell polyethylene foam.

* * * * *